United States Patent [19]

Willetts

[11] Patent Number: 4,915,535
[45] Date of Patent: Apr. 10, 1990

[54] CONNECTOR

[76] Inventor: Charles A. Willetts, 147A Vicarage Road, Wollaston, West Midlands, United Kingdom, DY8 4QU

[21] Appl. No.: 278,956

[22] Filed: Dec. 2, 1988

[30] Foreign Application Priority Data

Dec. 2, 1987 [GB] United Kingdom ............... 8728208
Dec. 12, 1987 [GB] United Kingdom ............... 8729084

[51] Int. Cl.$^4$ ................................................ F16B 7/08
[52] U.S. Cl. .................................... 403/191; 403/234; 403/344
[58] Field of Search ............... 403/191, 344, 233, 234

[56] References Cited

U.S. PATENT DOCUMENTS

| | | | |
|---|---|---|---|
| 1,102,126 | 6/1914 | Barnes et al. | 403/191 |
| 1,416,386 | 5/1922 | Selah . | |
| 2,718,266 | 9/1955 | Berry | 403/344 X |
| 3,021,159 | 2/1962 | Back | 403/191 |
| 4,397,448 | 8/1983 | Dillon | 403/191 X |

FOREIGN PATENT DOCUMENTS

| | | |
|---|---|---|
| 8712261 | 3/1988 | Fed. Rep. of Germany . |
| 2443607 | 7/1980 | France . |
| 927652 | 5/1963 | United Kingdom . |
| 1147705 | 4/1969 | United Kingdom ............... 403/191 |
| 1305717 | 2/1973 | United Kingdom . |

Primary Examiner—Andrew V. Kundrat
Attorney, Agent, or Firm—Kirschstein, Ottinger, Israel & Schiffmiller

[57] ABSTRACT

An assembly comprising a member, having a recess, connected by a connector to a component having an outwardly presented surface part, the connector comprising at least one pair of elements pivotally joined together by a pivotal joint means, each element having a female part and a male part which co-operate, respectively, to provide the connector with a female portion in which said surface part of the component is received and a male portion which is engaged in the recess of the member.

12 Claims, 7 Drawing Sheets

CONNECTOR

BACKGROUND TO THE INVENTION

This invention relates to a connector in or for an assembly comprising a member, having a recess, connected by the connector to a component having on outwardly presented surface part.

An object of the invention is to provide a new and improved connector in or for such an assembly.

SUMMARY OF THE INVENTION

According to one aspect of the invention we provide a connector comprising at least one pair of elements pivotally joined together by a pivotal joint means, each element having a female part and a male part which co-operate, respectively, to provide the connector with a female portion and a male portion.

The connector may comprise a plurality of pairs of elements, the elements of each pair being pivotally joined together by pivotal joint means, each element having a female part and a male part which co-operate, respectively, to provide the connector with a female portion and a plurality of male portions.

The pivotal joint means may comprise releasably interengaging formations provided on the female parts of the elements of the or each pair such as at least one dovetail shaped tongue and interengaging recess.

One element of the or each pair of elements may have a single dovetail or the like tongue and the other element a single recess for interengaging with said tongue.

Alternatively, the or each element of the or each pair may have at least one dovetail or like tongue and at least one recess to interengage with a tongue of another element.

Alternatively, the pivotal joint means may comprise a hinge and the hinge may permanently connect together the elements of the or each pair.

The hinge may comprise at least one hinge pin receiving formation provided on each element and a hinge pin extending between said formations.

Alternatively, the hinge may comprise a plurality of interengaging part spiral hinge formations.

Each male part may extend at right angles from a middle region of an associatd female part so that the longitudinal axes of the male and female parts of the connector in the assembly intersect and are mutually perpendicular.

The male part of each element may be of substantially semi-cylindrical shape and/or the female part of each element may be of substantially part cylinder shape.

The male parts may have an axially extending portion which is of semi-cylindrical external shape, and therebeing substantially radially extending projections lying substantially in a diametric plane of the semi-cylinder to provide abutment portions.

According to another aspect of the invention we provide an assembly comprising a member, having a recess, connected by a connector, according to the first aspect of the invention, to a component having an outwardly presented surface part, said surface part of the component being received in the female portion of the connector and the male portion of the connector being engaged in the recess of the member.

The assembly may comprise at least one further member the or each of which has a recess, the connector comprising a plurality of pairs of elements, the number of pairs being equal to the number of members, and the elements of each pair being pivotally joined together by pivotal joint means, each element having a female part and a male part which co-operate, respectively, to provide the connector with a female portion in which said surface part of the component is received and a plurality of male portions which are engaged in the recesses of the members.

The male parts may be arranged so that said engagement in the recess of the or each member causes the elements to clamp said surface part between the female parts.

The elements may clamp said surface part therebetween as a result of pivotal movement permitted by said pivotal joint means caused by urging of the male parts of the elements towards each other as a result of engagement thereof in the or each recess.

The or at least one recess may be disposed so as to extend axially inwardly at one end of the or at least one member and, when the or said at least one member is tubular, the or said at least one recess may be provided by an end part of the bore of the tube.

When the male parts of the elements are disposed so that the longitudinal axes thereof are parallel the female parts may be of a configuration so as to be an interference fit with the component.

When the male parts of the elements are disposed so that the longitudinal axis thereof are parallel the adjacent edges of the male parts may be spaced apart, and the male parts are shaped so as to engage the recess at positions to restrain relative transverse movement in all radial planes.

The male parts may have an axially extending portion which is of semi-cylindrical external shape, the axis of the semi-cylinder being disposed on the diametric plane of the semi-cylinder and the axes of said portions being spaced apart when the axes are parallel and therebeing substantially radially extending projections lying substantially in said diametric plane of the semi-cylinder to provide abutment portions for engagement with said recess, the projections of the male parts and a middle part of said semi-cylindrical portions, when the axes are parallel, substantially lying on a circle of a diameter substantially equal to that of the internal diameter of the recess.

BRIEF DESCRIPTION OF THE DRAWINGS

The invention will now be described by way of example with reference to the accompanying drawings wherein.

DESCRIPTION OF THE PREFERRED EMBODIMENT

Referring to the drawings an assembly comprises a member 10 which comprises a tube having a cylindrical external surface 11 and an axially extending bore providing an internal cylindrical surface 12 which affords a recess 13.

If desired, the member 10 may be of other configuration and for example, may be provided with a recess only at one or each end, the remainder of the member being for example, solid.

The member 10 is connected to a component 15 by a connector 20. The component 15, in the present example, is a tube identical to the member 10 but, if desired, the second member 15 may be of different shape and/or construction to the member 10.

The connector 20 comprises a pair of discrete elements 21a, 21b which are identical. Each element 21a, 21b has a male part 22a, 22b respectively and a female part 23a, 23b respectively. The male parts 22a, 22b and the female parts 23a, 23b of the elements 21a, 21b co-operate respectively, to provide the connector 20 with a male portion 24 and a female portion 25. The male portion 24 is received within the recess 13 of the first member 10 whilst an outwardly presented surface part 16 of the component 15 is received within the female portion 25.

The elements 21a, 21b are pivotally joined together by a pivotal joint means 26 provided by a dovetail shaped tongue 27a provided on the female part 23a and identical tongue 27b provided on the female part 23b. The tongues 27a, 27b are releasably received in co-operating recesses 28a, 28b provided on the female parts 23a, 23b respectively.

Figure 3:
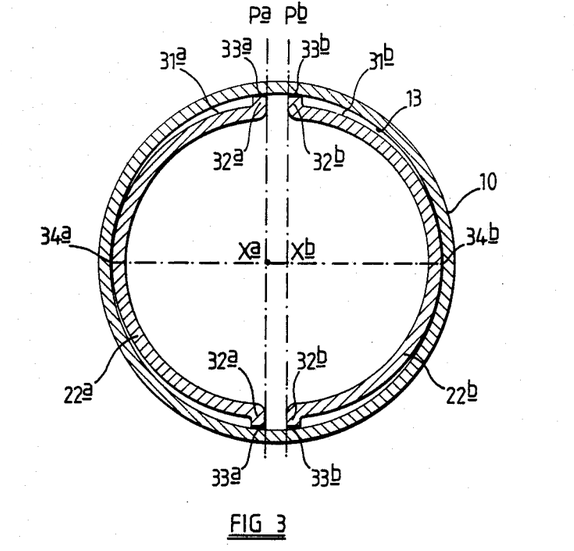
FIG. 3 is a section of the line 3—3 of FIGS. 1 and 2.

The male parts 22a, 22b have an axially extending portion 30a, 30b having an outer surface 31a, 31b the axes Xa, Xb of which lie on the respective diametric plane Pa, Pb. As best shown in FIG. 3, when the male parts 22a, 22b are disposed within the recess 13 they are parallel and the axes Xa, Xb respectively are also parallel but spaced apart by a small distance.

Accordingly, the diameter of the external surfaces 31a, 31b is less than the internal diameter of the recess 13 and therefore radially extending projections in the form of flanges 32a, 32b are provided to extend substantially in the respective planes Pa, Pb to provide abutment portions 33a, 33b for engagement with the wall of the recess 13. The abutment portions 33a, 33b and a middle part 34a, 34b of the portions 31a, 31b lie substantially on a circle having a diameter substantially the same as the diameter of the recess 13.

Figure 4:
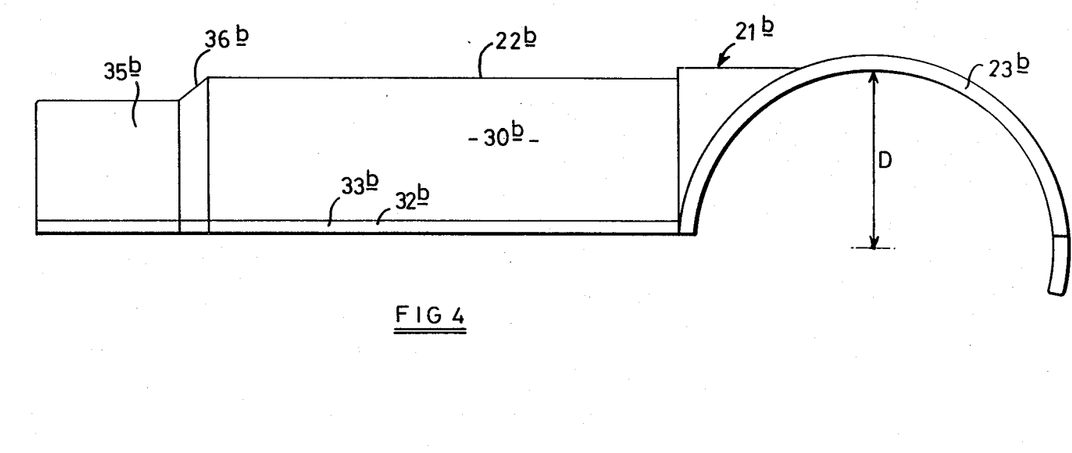
FIG. 4 is a plan view of one discrete element of the connector of FIGS. 1 to 3.

As best shown in FIG. 4 the female parts 23a, 23b have an internal diameter D which is slightly smaller than the exteral diamter of the surface part 16 of the component 15 so that when the portions 30a, 30b of the male parts 22a, 22b are disposed in the recess 13 the female parts are an interference fit with the component 15 and there is a corresponding reaction between the wall of the recess 13 and the parts 34a, 34b of the portions 30a, 30b. In addition, the abutment portions 33a, 33b are either engaged with or very closely spaced from the wall of the recess 13 so that the component 15 is clamped securely between the female parts 23a, 23b so that the connector 20 is prevented from movement relative thereto and the first member 10 is supported by the male parts 22a, 22b and so connected to the second member 15.

In use, assuming that the component 15 is part of a pre-existing assembly of tubes and is disposed vertically the elements 21a, 21b are offered up to the component 15 and the pivotal joint 26 assembled. The erector can then grasp the elements 21a, 21b with one hand, applying pressure to force the male parts 22a, 22b towards each other, and then the member 10 can be offered up to the male part with the operator's other hand. The male parts 22a, 22b are provided with a nose portion 35a, 35b of reduced dimensions compared with the portions 30a, 30b described hereinbefore with an inclined portion 36a, 36b therebetween to facilitate entry of the portions 30a, 30b into the recess 13.

Of course the component 15 may be separate from any other member and may be orientated as desired.

If desired the invention may be applied to a connector for connecting more than one member to the component 15. For example, referring to FIG. 5, there is shown a connector 120 for connecting two members 110a, 110b to a component 115. The members and component are as in the previously described embodiment. The connector 120 comprises a first pair of discrete elements 121a and a second pair of discrete elements 121b. Each element 121a, 121b has a male part 122a, 122b respectively and a female part 123a, 123b respectively. The male parts 122a of the one pair co-operate with the male parts 122b of the other pair to provide the connector 120 with two male portions 124. Similarly, the female parts 123a of the first pair co-operate together and with the female parts 123b of the second pair to provide the connector 120 with a female portion 125. The elements 121a of the first pair are pivotally joined together by pivotal joint means 126 identical to the pivotal joint means 26 described in connection with the first embodiment. The elements 121b of the second pair are similarly pivotally joined together by a pivotal joint means 126.

Figure 5:
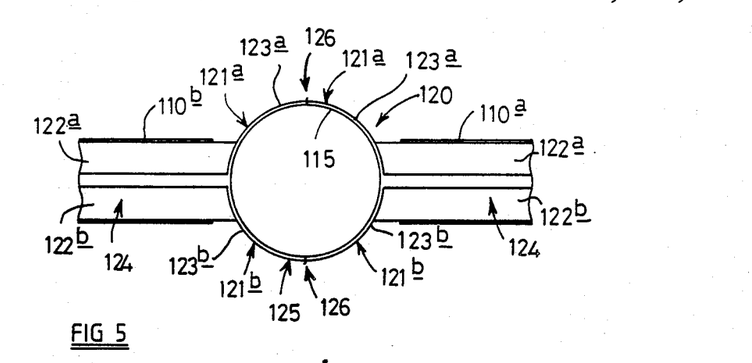
FIG. 5 is a fragmentary diagramatic section through an alternative assembly embodying the invention.

The male parts 122a, 122b are identical to the male parts described in connection with the first embodiment. The female parts 123a, 123b differ from the female parts of the first embodiment by being of substantially one quarter cylinder shape instead of being of semi cylindrical shape.

In all other respects the assembly is as described in connection with the first embodiment.

Figure 6:
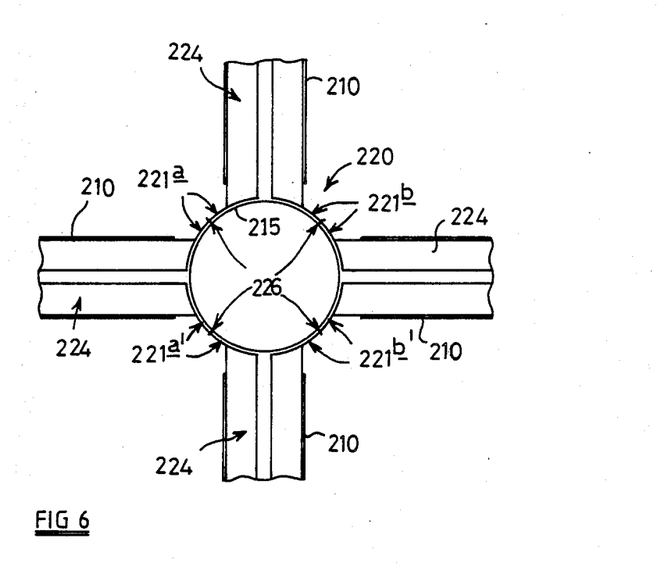
FIG. 6 is a similar cross-section showing a still further alternative assembly.
Figure 7:
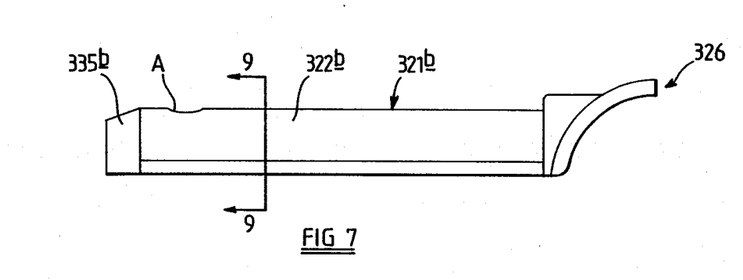
FIG. 7 is a side elevation of one element for use in a still further alternative assembly embodying the invention.
Figure 8:
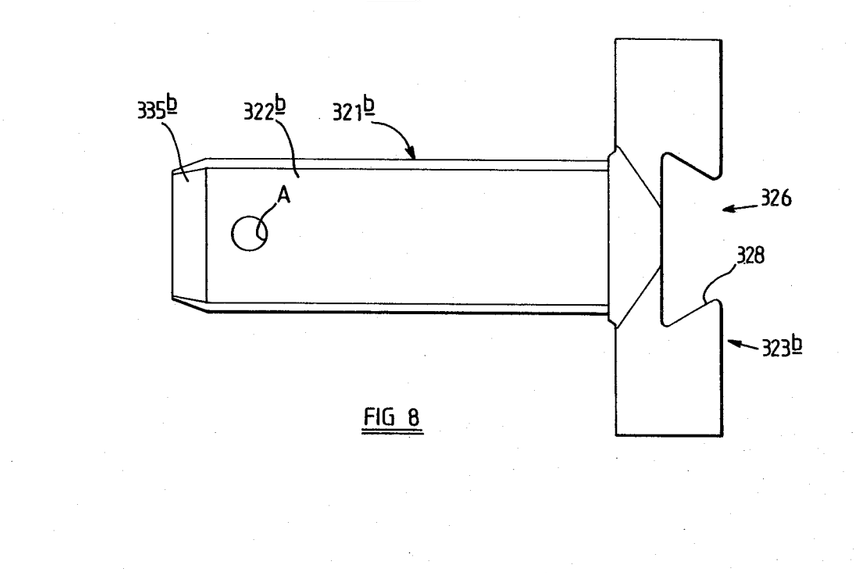
FIG. 8 is a plan view of the element of FIG. 7.
Figure 9:
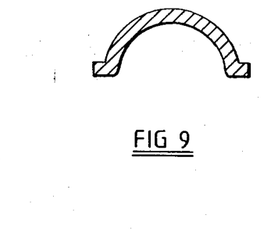
FIG. 9 is a cross-section on the line 9—9 of FIG. 7, FIGS. 10-12 are similar views to those of FIGS. 7-9 but showing a second element for use with the element of FIGS. 7-9.
Figure 10:
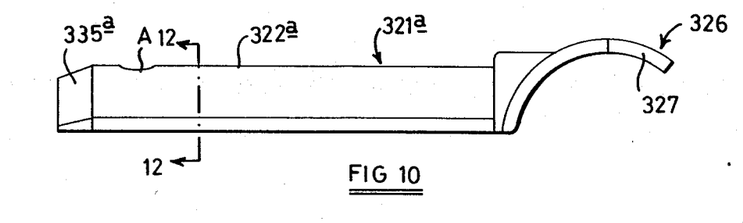
Figure 11:
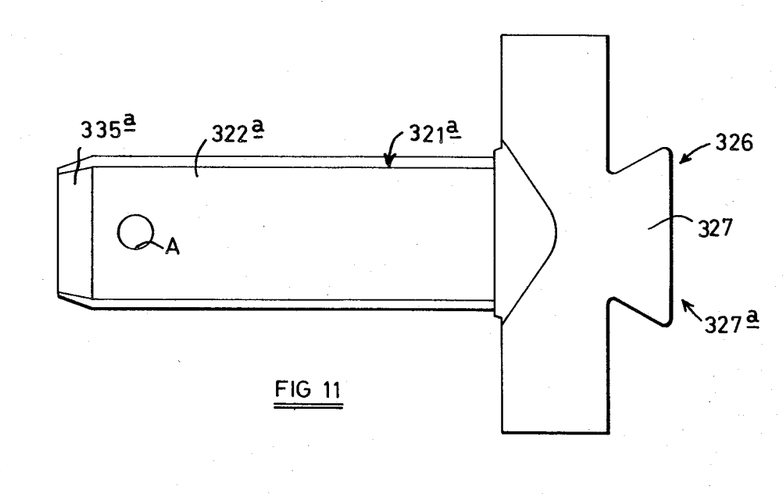
Figure 12:
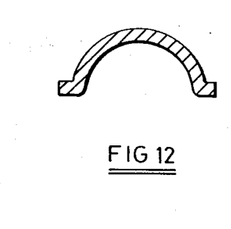

Referring now to FIG. 6 there is shown a further assembly comprising a connector 220 which connects four members 210 to an component 215. The connector 220 comprises a first pair of discrete elements 221a, a second pair of discrete elements 221b, a third pair of discrete elements 221a' and a fourth pair of discrete elements 221b'. Each element has a male part identical to the male parts described hereinbefore and the male part of adjacent pairs co-operate to provide the connector with four male portions 224. Each element also has a female part similar to the female parts described hereinbefore but being of one eighth cylindrical shape and the female parts of adjacent elements are pivotally joined together by a pivotal joint means 226 similar to the pivotal joint means 26 described hereinbefore. In all other respects the assembly is as in the previously described embodiments.

If desired the connector may be made of any appropriate number of pivotally joined together pairs of discrete elements to enable a different number of members to be connected to an element.

Figure 1:
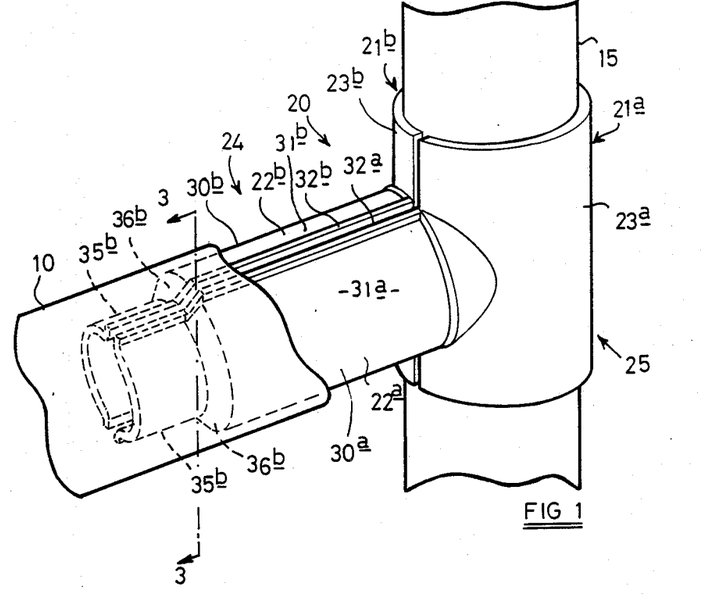
FIG. 1 is a fragmentary perspective view of an assembly embodying the invention.
Figure 2:
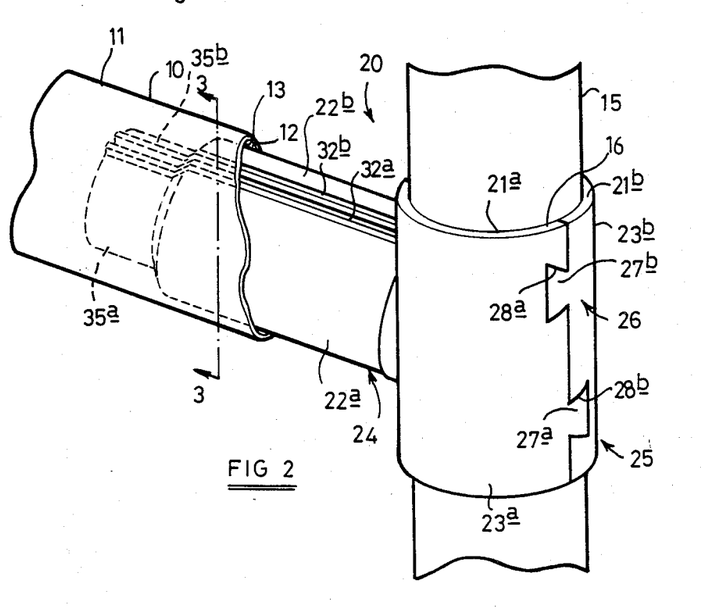
FIG. 2 is another fragmentary perspective view of the assembly of FIG. 1 taken from a different angle.

In a still further embodiment, elements to connect a member similar to the member 10 to a component similar to the component 15 illustrated at FIGS. 1 and 2 may be as illustrated in FIGS. 7-12. In this embodiment the elements are as described hereinbefore except that a pivotal joint means 326 comprises a single dovetail shape tongue 327 provided on a female part 327a of one element 321a which is releasably received in a co-operating recess 328 provided in the female part 323b of the other component 321b. The male parts 322a, 322b of each element 321a, 321b have a nose portion 335a, 335b of different configuration to the nose portion 35a, 35b of the first described embodiment in that the nose portion of this embodiment simply comprises a frusto-conical portion. In all other respects and manner of use the components are as described hereinbefore.

If desired, the elements described in connection with FIGS. 5 and 6 may be of the configuration described in connection with FIGS. 7-12 modified appropriately. An aperture A may be provided in each male part adjacent the free end thereof to facilitate suspension of the element for painting or other coating operation.

The elements are made as pressings in sheet metal, such as sheet steel and the elements may be identical as described in connection with FIGS. 1 to 4 so that only a single set of press tools are required, or may differ as described in connection with FIGS. 7-12. Of course, in either case, the elements may be made by simple pressing operation.

If desired the elements may be made from any suitable material in any other desired way.

Figure 13:
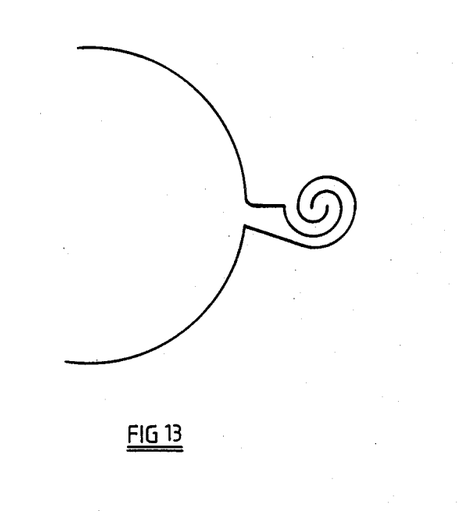
FIG. 13 is a fragmatic diagramatic cross-section showing an alternative, pivotal, joint means.

Instead of the dovetail configuration of tongue and recess described hereinbefore the or each tongue co-operating recess may be of other shape for example of T shape or any other configuration which would cause the elements to be retained together. Furthermore, instead of tongue and recess arrangement to provide the pivotal joint means 26, 126, 226, 326 other pivotal joint means may be provided such as a hinge comprising, for example, at least one hinge formation provided on the female parts in place of the dovetail tongues and recesses 27a, 27b; 28a, 28b and the like as described hereinbefore, and interconnected by a hinge pin in the manner of a conventional hinge. The pin may be made captive in which case the elements would be permanently connected together or may be removable to permit disassembly of the elements. Alternatively, the elements may be pivotally joined together by interengaged part spiral hinge formations, a cross-section through one of which is shown in FIG. 13 hereof.

Although in the herebefore described examples the or each member has an axially extending recess, if desired, the recess may be disposed so as to extend transversely to the longitudinal axis of at least one of the members and may be positioned intermediate the ends of the or said at least one member.

Figure 14:
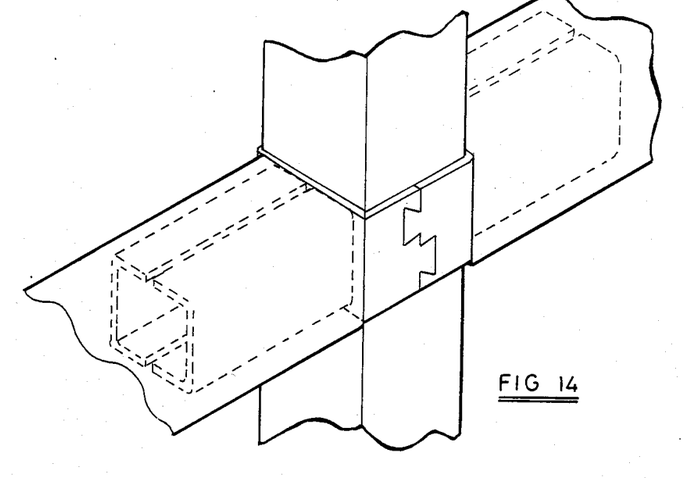
FIGS. 14 and 15 are diagrammatic perspective views of two further embodiments of the invention.
Figure 15:
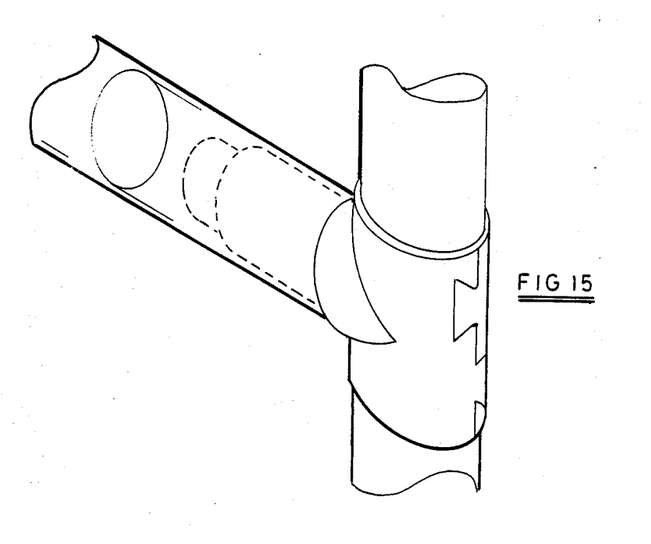

If desired the component 15, 115, 215 and/or the recess of the or at least one of the members 10, 110, 210 described hereinbefore may be of other then circular shape, for example, square, rectangular, hexagonal, triangular or elliptical and the elements provided with male and female parts of appropriate shape which co-operate to provide male and female portions of appropriate shape to engage within a respective recess or recesses and to clamp the component therebetween respectively. FIG. 14 shows a square configuration and FIG. 15 an elliptical configuration. In these cases, to restrain transverse relative movement between the male parts and the recess in which they are received the male parts may be provided so that their dimensions, in a vertical direction, in FIGS. 14 and 15 correspond to the internal dimensions in that direction of the recess, whilst the adjacent edges are spaced apart or they may be provided with out-turned flanges similar to the flanges 32a, 32b described hereinbefore.

If desired a further discrete element having a female part and a male part may be disposed longitudinally of the component relative to at least one of the discrete elements described hereinbefore and joined thereto by a joint means which may be a pivotal joint means disposed between the longitudinally ajacent edges of the respective female parts.

I claim:

1. An assembly comprising a member, having a recess, connected by a connector to a component having an outwardly presented surface part, the connector comprising at least one pair of discrete elements pivotally joined together by a pivotal joint means, each element having a female part and a male part which co-operate, respectively, to provide the connector with a female portion in which said surface part of the component is received and a male portion which is engaged in the recess of the member, said pivotal joint means comprising releasably interengaging formations provided on the female parts of the elements of said at least one pair.

2. An assembly according to claim 1 wherein the male parts are arranged so that said engagement in the recess of the or each member causes the elements to clamp said surface part between the female parts.

3. An assembly according to claim 2 wherein the elements clamp said surface part therebetween as a result of pivotal movement permitted by said pivotal joint means caused by urging of the male parts of the elements towards each other as a result of engagement thereof in the or each recess.

4. An assembly according to claim 1 wherein the recess is disposed so as to extend axially inwardly at one end of the member and, when the member is tubular, the recess being provided by an end part of the bore of the tube.

5. An assembly according to claim 1 wherein said pivotal joint means comprises at least one re-entrant tongue and interengaging recess.

6. An assembly according to claim 5 wherein one element has a single re-entrant tongue and the other element a single recess for interengaging with said tongue.

7. An assembly according to claim 5 wherein each element has at least one re-entrant tongue and at least one recess to interengage with a tongue of another element.

8. An assembly according to claim 1 wherein the male part extends at right angles from a middle region of the female part so that the longitudinal axes of the male and female parts of the connector in the assembly intersect and are mutually perpendicular.

9. An assembly according to claim 1 wherein the female parts are of a configuration so as to be an interference fit with the component when the male parts of the elements are disposed so that the longitudinal axes thereof are parallel and the adjacent edges of the male parts are spaced apart.

10. An assembly comprising a member, having a recess, connected by a connector to a component having an outwardly presented surface part, the connector comprising at least one pair of elements pivotally joined together by a pivotal joint means, each element having a female part and a male part which co-operate, respectively, to provide the connector with a female portion in which said surface part of the component is received and a male portion which is engaged in the recess of the member, wherein the female parts are of a configuration so as to be an interference fit with the component, when the male parts of the elements are disposed so that the longitudinal axes thereof are parallel and the adjacent edges of the male parts are spaced apart, and the male parts are shaped so as to engage the recess at positions to restrain relative transverse movement in all radial planes.

11. An assembly according to claim 10 wherein the male parts have an axially extending portion which is of semi-cylindrical external shape, the axis of the semi-cylinder being disposed on the diametric plane of the semi-cylinder and the axes of said portions being spaced apart when the axes are parallel and therebeing substantially radially extending projections lying substantially in a diametric plane of the semi-cylinder to provide abutment portions for engagement with said recess, the projections of the male parts and a middle part of said semi-cylindrical portions, when the axes are parallel, substantially lying on a circle of a diameter substantially equal to that of the internal diameter of the recess.

12. An assembly comprising a member, having a recess, connected by a connector to a component having an outwardly presented surface part, the connector comprising at least one pair of elements pivotally joined together by a pivotal joint means, each element having a female part and a male part which co-operate, respectively, to provide the connector with a female portion in which said surface part of the component is received and a male portion which is engaged in the recess of the member, wherein the assembly comprises at least one further member the or each of which has a recess, the connector comprising a plurality of pairs of elements, the number of pairs being equal to the number of members, and the elements of each pair being pivotally joined together by pivotal joint means, each element having a female part and a male part which co-operate, respectively, to provide the connector with a female portion in which said surface part of the component is received and a plurality of male portions which are engaged in the recesses of the members.

* * * * *